(12) United States Patent  
Stiffler et al.

(10) Patent No.: US 7,840,768 B2  
(45) Date of Patent: Nov. 23, 2010

(54) MEMORY-CONTROLLER-EMBEDDED APPARATUS AND PROCEDURE FOR ACHIEVING SYSTEM-DIRECTED CHECKPOINTING WITHOUT OPERATING-SYSTEM KERNEL SUPPORT

(75) Inventors: Jack Justin Stiffler, Marlon, MA (US); Donald D. Burn, Westborough, MA (US)

(73) Assignee: Reliable Technologies, Inc., Weston, MA (US)

( * ) Notice: Subject to any disclaimer, the term of this patent is extended or adjusted under 35 U.S.C. 154(b) by 0 days.

(21) Appl. No.: 12/580,392

(22) Filed: Oct. 16, 2009

(65) Prior Publication Data

US 2010/0077164 A1  Mar. 25, 2010

Related U.S. Application Data

(63) Continuation-in-part of application No. 11/301,814, filed on Dec. 13, 2005, now abandoned.

(51) Int. Cl.
  *G06F 12/00* (2006.01)
(52) U.S. Cl. ............... 711/162; 711/154; 711/156; 714/13; 707/649; 700/82; 710/52; 710/56
(58) Field of Classification Search .......... 711/162, 711/154, 156; 714/13; 707/204, 649; 700/82; 710/52, 56
  See application file for complete search history.

(56) References Cited

U.S. PATENT DOCUMENTS 4,959,774 A * 9/1990 Davis ..................... 714/6

5,737,514 A * 4/1998 Stiffler ................... 714/13
5,745,672 A * 4/1998 Stiffler ................... 714/6
5,787,243 A * 7/1998 Stiffler ................... 714/13

(Continued)

OTHER PUBLICATIONS

"Interim Guidance for Determining Subject Matter Eligibility for Process Claims in View of *Bilski* v. *Kappos*," Federal Register, vol. 75, No. 143, Tuesday, Jul. 27, 2010/ Notices, pp. 43922-43928.*

*Primary Examiner*—Stephen C Elmore

(57) ABSTRACT

System-directed checkpointing is enabled in otherwise standard computers through relatively straightforward augmentations to the computer's memory controller hub. Firmware routines executed by a control and dispatch unit that is normally part of any memory controller hub enable it to implement any of six different checkpointing strategies: post-image checkpointing in which an image of the system state at the time of the last checkpoint is maintained in a local shadow memory; post-image checkpointing in which an image of the system state at the time of the last checkpoint is maintained in a shadow memory located in a second, backup computer; post-image checkpointing using a bit-map memory, having one bit representing each data block in system memory, to reduce the amount of memory-to-memory copying required to establish a checkpoint; post-image checkpointing to a local shadow memory using two bit map memories to enable normal processing to continue while the shadow is being updated, post-image checkpointing to a local shadow memory using a block-state memory that eliminates the need for any memory-to-memory copying; and local pre-image checkpointing that does not require a shadow memory. Since each of these implementations has advantages and disadvantages relative to the others and since similar mechanisms are used in the memory controller hub for all of these options, it can be designed to support all of them with hardwired or settable status bits defining which is to be supported in a given situation.

18 Claims, 11 Drawing Sheets

Figure 2

U.S. PATENT DOCUMENTS

| | | | |
|---|---|---|---|
| 5,815,647 A * | 9/1998 | Buckland et al. | 714/3 |
| 5,835,764 A * | 11/1998 | Platt et al. | 718/101 |
| 5,958,070 A * | 9/1999 | Stiffler | 714/13 |
| 6,622,263 B1 * | 9/2003 | Stiffler et al. | 714/13 |
| 7,120,788 B2 * | 10/2006 | Ramirez | 713/100 |
| 7,376,860 B2 * | 5/2008 | Jia et al. | 714/5 |
| 2010/0037096 A1 * | 2/2010 | Bum et al. | 714/19 |

\* cited by examiner

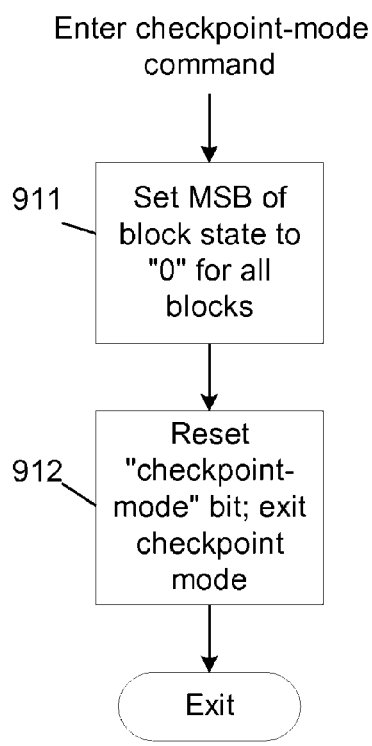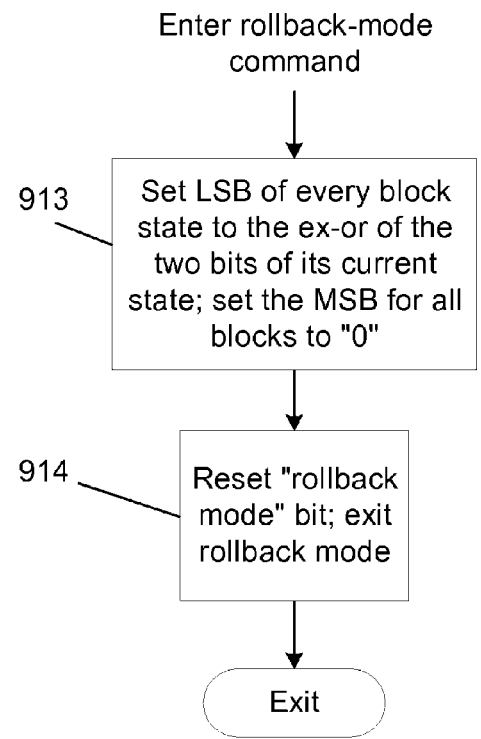
Fig. 9a
Fig. 9b

MEMORY-CONTROLLER-EMBEDDED APPARATUS AND PROCEDURE FOR ACHIEVING SYSTEM-DIRECTED CHECKPOINTING WITHOUT OPERATING-SYSTEM KERNEL SUPPORT

RELATED APPLICATIONS

This application is a Continuation in Part of application Ser. No. 11/301,814, filed on Dec. 13, 2005, now abandoned by Jack J. Stiffler and Donald Burn.

FIELD OF THE INVENTION

This invention relates to apparatus and techniques for achieving fault tolerance in computer systems and, more particularly, to techniques and apparatus for establishing and recording a series of consistent system states from which all running applications can be safely resumed following a fault.

BACKGROUND OF THE INVENTION

"Checkpointing" has long been used as a method for achieving fault tolerance in computer systems. It is a procedure for establishing and recording a consistent state, either for a specific application or for the computer system as a whole, from which the specific application or all running applications, respectively, can be safely resumed following a fault. In order to checkpoint the entire system, its complete state, that is, the contents of all processor and I/O registers, cache memories, and system memory at a specific instance in time, is periodically recorded to form a series of checkpointed states. When a fault is detected, the system, possibly after first diagnosing the cause of the fault and circumventing any malfunctioning component, is returned to the last checkpointed state by restoring the contents of all registers, caches and system memory from the values stored during the last checkpoint. The system then resumes normal operation. If inputs and outputs (I/Os) to and from the computer are correctly handled, and if, in particular, the communication protocols being supported provide appropriate protection against momentary interruptions, this resumption from the last checkpointed state can be effected with no loss of data or program continuity. In most cases, the resumption is completely transparently to users of the computer.

Checkpointing has been accomplished in commercial computers at two different levels. Early checkpoint-based fault-tolerant computers relied on application-directed checkpointing. In this technique, one or more backup computers were designated for each running application. The application was then designed, or modified, to send periodically to its backup computer, all state information that would be needed to resume the application should the computer on which it was currently running fail in some way before the application was able to establish the next checkpoint.

This type of checkpointing could be accomplished without any specialized hardware, but required that all recoverable applications be specially designed to support this feature, since most applications would normally not write the appropriate information to a backup computer. This special design placed a severe burden on the application programmer not only to ensure that checkpoints were regularly established, but also to recognize what information had to be sent to the backup computer. Therefore, in general, application-directed checkpointing has been used only for those programs that have been deemed especially critical and therefore worth the significantly greater effort required to program them to support checkpointing.

System-directed checkpointing has also been implemented in commercial computer systems. The term "system-directed" refers to the fact that checkpoints are taken of the system as a whole and applications do not have to be modified in any way to take advantage of the fault-recovery capability offered through checkpointing. System-directed checkpointing has the distinct advantage of alleviating the application programmer from all responsibility for establishing checkpoints. Unfortunately, its implementation has been accomplished through the use of specialized hardware and software, making it virtually impossible for such systems to remain competitive in an era of rapidly advancing state-of-the-art commodity computers.

More recently, techniques have been disclosed for achieving system-directed checkpointing on standard computer platforms. These techniques, however, all require either specialized plug-in hardware components or else modifications to the operating system kernel. The plug-in components intercept either reads from memory, or writes to memory, so that the information needed to establish a checkpoint can be made available to the checkpointing software. This procedure suffers from the fact that the intercepting hardware introduces additional delays in the processor-to-memory path, making it difficult to meet the increasingly tight timing requirements for memory access in state-of-the-art computers. This problem can be circumvented if the operating system kernel is modified to enable certain memory writes to be interrupted momentarily so that either the pre-image of the addressed section of memory, or the address itself, can be captured and recorded elsewhere in memory. The problem with this approach is that it can be implemented only on systems having operating systems that have be so modified.

SUMMARY OF THE INVENTION

Additional features are embedded in an otherwise standard memory controller hub (MCH) enabling it to support a number of different system-directed checkpoint strategies. Moreover, subsets of these features can support each of the various strategies individually. In particular, in the simplest embodiment of the present invention, functionality is embedded in the MCH to enable it to store into a buffer located in an auxiliary memory or in a dedicated region of system memory the address of each block of memory written to since the last checkpoint. Following each checkpoint, it then copies the contents of the blocks thus modified into the corresponding locations in a local shadow memory.

In a slightly more complex embodiment, the MCH is also given the ability to store the data blocks as well as the addresses associated with each modified location and, following a declared checkpoint, to transfer the contents of these data blocks, along with their associated addresses, to a shadow memory.

In another embodiment of the invention, the MCH is further is further augmented with features that enable it exploit the computer's cache-coherency protocol to store the relevant memory addresses and data blocks into a buffer in response to any of the following processor bus operations: read with intent to modify, read with exclusive ownership, cache-line invalidation. This added capability eliminates the need to flush the processors' caches to establish a checkpoint.

In still another embodiment of the invention, a bit-map memory or, alternatively, an interface to an external bit-map memory, containing one or two bits for each data block in system memory, is integrated into the MCH. This bit-map memory offers advantages when used with some of the aforementioned checkpointing strategies by eliminating the need to copy more than once data blocks having the same memory address or by enabling normal processing to resume while data to be checkpointed is being copied to a shadow memory. In yet another embodiment of the present invention, a bit-map memory containing two bits for each data block in system memory is used to enable a locally resident shadow memory to be kept in a state reflecting the most recent checkpoint without the need for any data blocks whatsoever to be copied from one location to another.

All of the preceding embodiments of the invention require the existence of a shadow memory either locally or in a second computer. Checkpointing to a shadow memory will be referred to as "post-image" checkpointing. Another embodiment of the invention, however, allows local checkpointing to be accomplished without the need for a shadow memory. This strategy will be referred to as "pre-image" checkpointing. In this case, logic is embedded in the MCH that, on each memory write, delays the write until the memory block being accessed is copied to a data buffer and its associated address to an address buffer. Checkpointing is then accomplished simply by flushing the processors' caches. Memory-to-memory copies are needed only in the event of a fault in which case recovery entails copying the buffered data back from the buffer to the corresponding system-memory locations in last-in, first-out order. This enhancement can also be combined with the aforementioned exploitation of the computer's cache-coherency protocol to obviate the need to flush the processor caches and, independently, with the use of a bit map to eliminate the need to intervene in a write to any given memory block more than once during any checkpoint interval.

All of the aforementioned MCH enhancements enable checkpointing techniques to be realized using otherwise standard hardware platforms running standard operating systems. As a consequence, when these techniques are used in conjunction with the checkpointing and rollback procedures described in U.S. Pat. No. 6,622,263, standard computers can be rendered fault tolerant without requiring the major hardware and software modifications normally associated with fault-tolerant computers. All applications receive the benefit of fault tolerance without having to be modified in any way.

BRIEF DESCRIPTION OF THE DRAWINGS

The above and further advantages of the invention may be better understood by referring to the following description in conjunction with the accompanying drawings in which:

FIGS. 9a and 9b are flowcharts showing the procedures executed by the control and dispatch unit to effect a checkpoint and to implement a rollback when checkpointing is implemented without requiring any memory-resident address or data buffers or any memory-to-memory copying.

DETAILED DESCRIPTION

Figure 1:
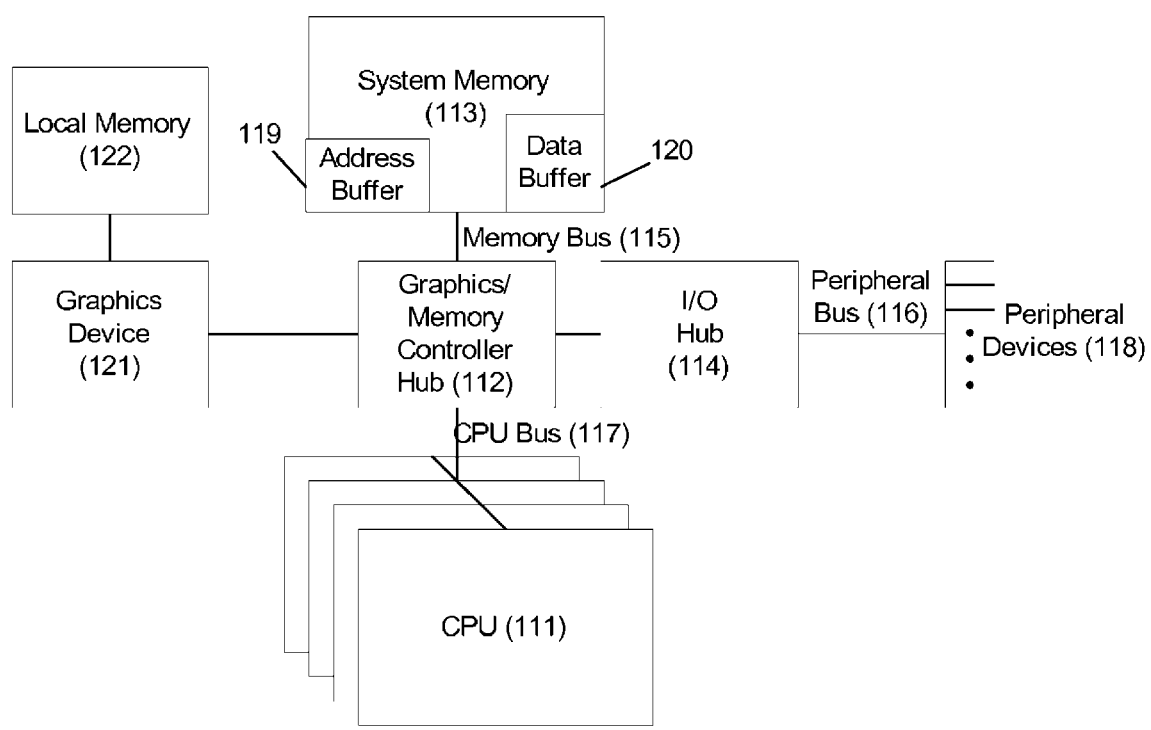
FIG. 1 is a block schematic diagram of a generic computer system showing the memory controller hub and the data and address buffers used by the present invention for checkpointing purposes.

Several embodiments of the invention are described. All of these embodiments can be implemented with a relatively modest increment to the logic normally found in the memory control section a standard computer. This portion of a computer is typically integrated into a single unit variously called the memory control unit or the memory controller hub. It is sometimes also integrated with a graphics control unit and called the graphics/memory controller hub. In the following discussion, the term "memory controller hub" or the abbreviation "MCH" will be used in reference to this computer element.

All embodiments of the invention can be implemented with the same augmented memory controller hub since the required additional logic elements are similar for each of them. The different embodiments will be described separately, however, since none of them requires the full complement of incremental logic. All of the required logic elements can be easily implemented using standard procedures by one knowledgeable in the state of the art and, with the possible exception of those embodiments utilizing integrated memory, represent a small increment in the complexity of the logic already present in existing memory controller hubs.

The checkpointing strategies implemented by these various embodiments fall into two general categories. The first is referred to as "post-image checkpointing" and requires the existence of a shadow memory located either in the subject computer itself, hereafter called the "primary" or "protected" computer, or in a second computer called the "backup" or "remote" computer. In either case, the shadow memory is updated at the conclusion of each checkpoint interval to reflect the state of the primary computer at that instant in time. If the shadow memory is in a backup computer, a strategy referred to as remote checkpointing, the updating process preferably involves first copying any shadow updates to a buffer in the backup and from there to the shadow memory. Handling the updates in this manner guarantees that the shadow does indeed represent a consistent checkpoint state even if the primary fails while the updates are being transferred. If the shadow memory is located in the primary computer, a strategy called "local" checkpointing, such precautions are unnecessary because any failure that would prevent the copying process from being resumed would presumably be fatal in any case. Nevertheless, local checkpointing is attractive since it has been shown to provide a high degree of resilience to faults caused both by software bugs and by hardware transient events and since these two types of events together account for a large majority of computer crashes.

The second checkpointing strategy, "pre-image checkpointing", does not require a shadow memory and is applicable only to local checkpointing. In this case, the pre-image of any memory block is captured before it is allowed to be modified following a checkpoint and stored in a buffer location along with its address. The recovery process following a fault then entails copying the pre-images, i.e., the memory images that prevailed at the time of the last successful checkpoint, back to their original locations in system memory, thereby restoring the system state that existed at the time of that checkpoint.

It should be noted that all system-level checkpointing strategies rely on the assumption that the entire state of the system is captured at each checkpoint. This requires the processors in a multiprocessor system to rendezvous when it is time to establish a checkpoint and for each of them to force its state onto the appropriate memory stack and possibly, depending on the particular embodiment of the invention being implemented, to flush the modified contents of their caches out to system memory. In addition, sufficient state must be retained in system memory to ensure that I/O operations can be restarted correctly following a fault. These requirements can be satisfied through the use of separate I/O processors or through other procedures discussed in detail in U.S. Pat. No. 6,622,263. Similarly, the rollback and recovery procedures discussed in that patent are identical to those assumed here. The focus of this disclosure is on an apparatus and associated procedures for enabling the relevant contents of system memory to be captured at each checkpoint and either retained until the next checkpoint to be used to restore memory to its last checkpointed state in the event of a fault, or else used to maintain a shadow memory in a state identical with the state of system memory at the time of the most recent checkpoint and, in either case, to do so with minimum modifications to an otherwise standard computer.

In all of these embodiments of the invention in which checkpoints are established in a backup computer, the protected computer can also serve as a backup for either its backup computer or can operate in a clustered environment in which each computer serves as the backup for another computer in the cluster. Following a fault in one of the computers, the programs that were being executed in that computer at the time of the fault are resumed in its backup, those being executed in the backup are resumed in its backup, etc., again as discussed in U.S. Pat. No. 6,622,263.

FIG. 1 illustrates a generic computer architecture. The central processing unit (CPU) 111 is typically composed of one or more processors along with their associated registers, cache memories and boot read-only memories (ROMs) (not shown). The CPU communicates with the rest of the system via processor bus 117. The graphics/memory controller hub (MCH) 112 connects the processor bus to input/output (I/O) hub 114 and to memory bus 115 and through it to system memory 113. The I/O hub, in turn, connects to one or more peripheral buses 116 and provides the control logic needed to communicate over those buses, typically with disk and tape storage units and with various types of communications controllers. Actual implementations vary. In some cases the CPU and the memory control unit may be integrated into a single unit; in other cases the memory controller and I/O hubs may be so integrated.

Regardless of how it is implemented, however, the MCH 112 contains the logic needed to coordinate communication between the processors, the system memory and the I/O hub. The MCH typically implements the following features that are of particular interest in the present invention:

1. It enforces the relevant cache-coherency protocol. For illustrative purposes, the cache-coherency protocol is assumed here to be the MESI protocol (referring to the modified, exclusive, shared and invalid states of each line held in a processor's cache), but with obvious modifications, alternative protocols could be supported just as readily, including directory-based protocols.

2. It supports direct-memory access (DMA) transfers between system memory and the I/O hub and between different segments of system memory. It may, in fact, and preferably does, support more than one memory channel so that data can be even more efficiently be transferred from one part of memory to another.

The present disclosure entails no physical modification to this generic architecture other than the MCH enhancements to be described here. Some embodiments of the invention require a small segment of system memory (113) to be partitioned off and used as an address buffer (119) and in other embodiments also require a second segment of memory to be partitioned as a data buffer (120). Alternatively, these buffers could also be implemented in a dedicated random-access memory accessible only by the MCH itself.

In the following description of the various embodiments of the invention, the term "memory block", "data block" or simply "block" will be used repeatedly. This refers to a fixed-size segment of memory. At minimum, its size is the smallest segment of memory that is usually modified in one operation, typically a cache line. It can, however, be as large as a memory page or even larger. The most efficient size is a function of both the bus transfer parameters of the computer in question and of the specific embodiment of concern. The specific block size, however, is not material so far as the details of the various embodiments are concerned. Also, in the following discussion, the term "system memory" will be used to designate the complex of random-access memory elements that are available to the entire system, including all of the central processing units (CPUs) and input/output (I/O) hub. Similarly, the term "processors" without further qualification will be used interchangeably with the terms "central processing units" and "CPUs"

Figure 2:
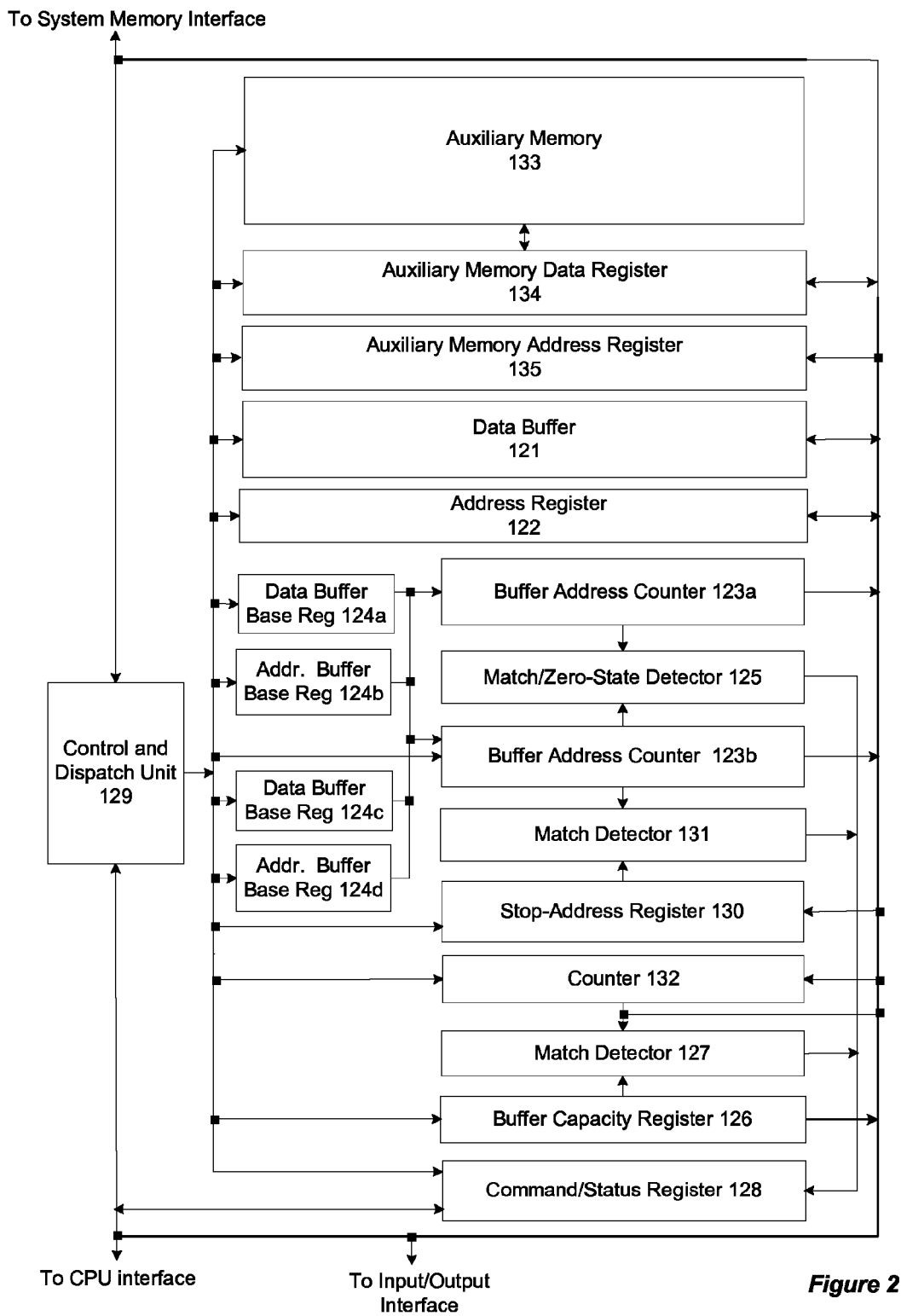
FIG. 2 is a block schematic diagram of a portion of the memory controller hub showing the control and dispatch unit and the registers, buffers and comparison logic needed to support all embodiments of the invention.

A block diagram of the MCH functional elements needed to support checkpointing is shown in FIG. 2. Not all of the elements are needed for any single embodiment of the invention, but the complete set of elements shown there is sufficient to implement all of them. The complete set of elements includes:

a) A data buffer 121 of size sufficient to hold at least one data block;

b) A block address register 122 sufficient in width to address every data block in system memory;

c) Two buffer address counters 123*a* and 123*b* of width sufficient to access each entry in address buffer 119 and data buffer 120;

d) Four base address registers 124*a*, 124*b*, 124*c* and 124*d* that identify the location of the data and address buffers, each of which may be duplicated, in system memory or in an auxiliary memory dedicated to that purpose;

e) A match and zero-state detector 125 capable of recognizing when the contents of the two buffer address counters are identical or when either of either of them are in the all-zeros state;

f) A stop-address register 130 equal in size to the buffer address counters and loadable from either of them;

g) A second match detector 131 capable of detecting when the contents of the stop-address register are identical to those of either of the buffer address counters;

h) A counter 132 loadable from buffer address counter 123a and capable of being incremented, decremented and reset;

i) A buffer capacity register 126 settable to a predetermined fraction of the size of the address and data buffers 119 and 120;

j) A third match detector 127 capable of detecting when the contents of either of the buffer address counters or of the up/down counter are identical to those of the buffer-capacity register;

k) An auxiliary memory 133 containing up to two bits for every data block in system memory;

l) An input/out register 134 whose contents can be loaded from or stored to the auxiliary memory and containing logic to identify when its contents are all zeros;

m) An address register 135 for accessing the auxiliary memory;

n) A command/status register 128;

o) And a control and dispatch unit 129.

The control and dispatch unit (CDU) is a normal part of any memory controller hub and is typically implemented as a microcontroller or microprocessor capable of executing programs stored in read-only memory. These firmware routines enable the CDU, among other things, to read data from, and to store data to, the computer's system memory and to and from the I/O hub. This invention entails additional firmware routines that enable the CDU to implement system-directed checkpointing.

Some or all of the apparatus shown in FIG. 2 need not be integrated into the memory controller hub itself. The auxiliary memory 133, in particular could easily be implemented in an external local memory, as could some, or all, of the registers. In addition, some of the registers shown in FIG. 2, e.g., base registers 124 and buffer capacity register 126, could be hard-wired. Implementing them as registers, however, enables the MCH to be optimized for the application of interest. Further, some or all of these registers could be intrinsic to the microcomputer used to implement the CDU; they are shown here as external elements for purposes of exposition. Similarly, data block buffer 121 and address register 122 are normally part of any MCH and are assumed in the following discussion to be used by as needed whenever the CDU transfers data to and from system memory or the I/O hub.

Command/status register 118 stores command and status bits settable by the CPUs and CDU reflecting the checkpoint system state and "pointer" bits used by the CDU to designate, for example, which set of memory address registers is to be used to identify buffer locations. In addition, it may contain "embodiment" bits to define which of the various embodiments of the invention is to be implemented for the specific application of interest. More specifically, the command/status register is used to store command and status bits with the following designations:

a) "fault mode";
b) "checkpoint mode";
c) "checkpoint-copy-complete";
d) "buffer-nearly-full";
e) "rollback mode";
f) "shadow-memory pointer";
g) "current-buffer/map pointer";
h) "copy-map/shadow-memory pointer";
i) "checkpointing enabled";
j) "remote checkpointing";
k) "remote backup";
l) "bus snooping enabled"

The last four of these command/status bits are embodiment bits that, when set, indicate, respectively, that checkpointing is being implemented in the subject computer system, that the checkpoints are to be established in a remote backup computer, that the subject computer is serving as a backup for another computer and that the cache-coherency protocol implemented by the MCH is to be used to determine when an access to a system memory block may result in that block's being modified. These embodiment bits are either hard wired or else set at system start-up.

The first five of these command/status bits are the means whereby the system processors and the CDU communicate While they could be monitored by the processors to determine when the CDU sets or resets one of them and vice versa, it is preferable that the act of setting or resetting them generates an interrupt to the other entity. This will be assumed in the ensuing discussion. The specific ways in which these command/status bits are used to coordinate the checkpointing operations executed by the CDU are explained in the following paragraphs.

The shadow-memory pointer bit is used to identify which of the computer's memory banks is currently serving as the shadow memory. Rollback following a fault using those embodiments is effected by complementing this bit, thereby directing all normal memory accesses to the former shadow memory as described in U.S. Pat. No. 6,622,263. The other two pointer bits are used by the CDU to coordinate its checkpointing operations.

In addition to these twelve bits, the command/status register also contains three status bits that determine which of the checkpoint methodologies described below is being implemented: As will be seen, not all of these bits are needed for all embodiments.

The "fault mode" is set by one of the processors upon detection of a fault. The CDU remains in fault mode until explicitly commanded to exit that mode of operation. When in fault mode, the CDU continues to respond to I/O-initiated memory-accesses in the normal way, using normal handshake protocols, but no data written to memory is in fact actually stored in memory. This is to insure that memory is not corrupted with I/O data while it is being restored to the state that existed at the time of the last successfully established checkpoint and I/O activity can be restarted.

Since it may be desirable to suppress the added MCH functionality described herein in cases in which checkpointing is not needed or not feasible for other reasons, the added MCH features are activated only after a processor sets the "checkpoint-enabled" status bit and are deactivated when this bit is reset. The purpose and use of the remaining bits in command/status register 118 will be explained in the following discussion of the various embodiments of the invention.

1) Local Post-Image Checkpointing Using an Address Buffer

The simplest embodiment of the invention implements a post-image checkpointing strategy and involves only an address buffer (119) and the incremental MCH logic, as described below, needed to implement the flowchart shown in FIG. 3.

Figure 3:
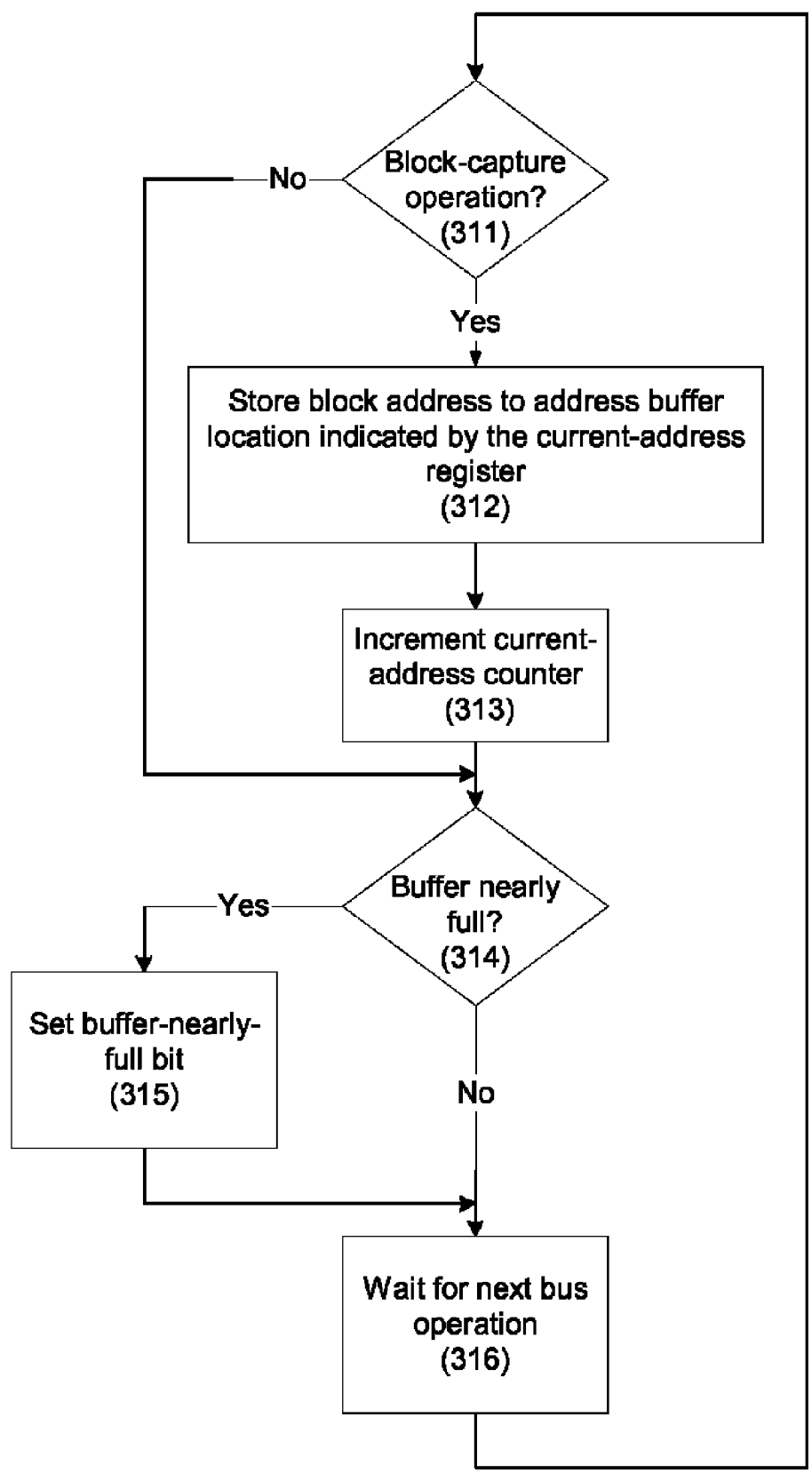
FIG. 3 is a flowchart illustrating the process executed by the control and dispatch unit to implement checkpointing in the embodiment of the invention using one address buffer and no data-block buffers.

In accordance with the flowchart in FIG. 3, the CDU, in addition to its normal functions, monitors the processor and I/O buses for "block-capture" operations. In this first embodiment of the invention, these block-capture operations are simply write operations to system memory initiated by any processor or I/O device. When a write operation is detected (step 311), the CDU appends the associated block address onto address buffer 119 at the location indicated by the "current-address register" defined by concatenating buffer base register 124b with buffer address counter 123a, here called the "current-address counter" (step 312). It then increments buffer address counter 123a (step 313) and checks match detector 127 to determine if incremented counter contents match the preset contents of buffer capacity register 126 indicating that the address buffer is nearing capacity (step 314). If it is, it sets the "buffer-nearly-full" status bit (step 315). It then suspends this activity and waits for the next bus operation (step 316). Preferably, as noted above, the act of setting the buffer-nearly-full status bit generates a processor interrupt, precipitating a checkpoint. Also preferably, the contents of register 126 can be explicitly set by the system software since different applications may require different strategies and different buffer sizes. In any case, it is set to some fraction of the address buffer's full capacity so that the CPUs have ample time to respond and to capture any residual system state before the buffer actually overflows.

When it is time to establish a checkpoint, the computer's processors rendezvous in the usual manner; each processor flushes its internal state and the contents of all its modified cache lines out to system memory. When they have completed flushing their caches, they again rendezvous and a designated processor sets the "checkpoint mode" bit in command/status register 128 placing the CDU in checkpoint mode. The processors then cease normal program execution while the CDU copies all modified data blocks, identified by the addresses in address buffer 119 from system memory to their corresponding locations in local shadow memory. The CPUs resume normal program execution when the CDU exits checkpoint mode.

The decision to enter checkpoint mode is governed by a number of factors (e.g., elapsed time since the last checkpoint, pended synchronous I/O events, etc.) one of which may be the fact that the address buffer is approaching capacity.

Figure 4:
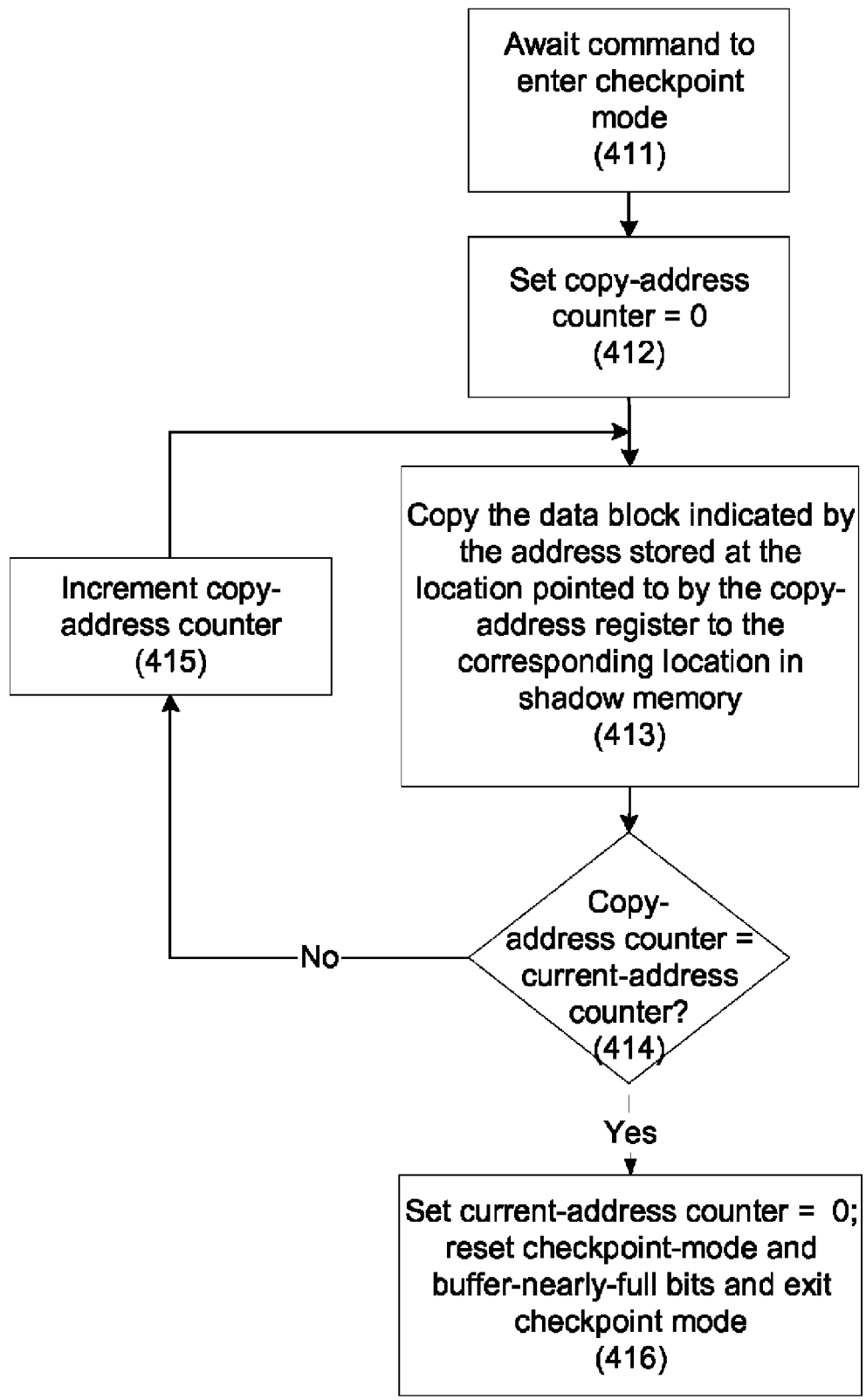
FIG. 4 is a flowchart illustrating the process executed by the control and dispatch unit to establish a new consistent system state in shadow memory in the above embodiment of the invention.

The CDU operations in checkpoint mode are shown in FIG. 4. The CDU enters checkpoint mode when a processor sets the checkpoint mode command/status bit in command/status register 128 (step 411). It sets buffer address counter 123b to zero (step 412) and begins copying, in first-in, first-out (FIFO) order, the contents of the data block corresponding to the address stored in address buffer 119 at the location indicated by the "copy-address register", defined by the concatenation of base register 324b with buffer address counter 123b, here called the "copy-address counter", to its corresponding location in a local shadow memory (step 413). After each such copy operation, the CDU checks the output of match/zero-state of detector 125 to determine if the contents of the two buffer address counters (123a and 123b) are identical (step 414). If they are not, it increments counter 123b (step 315) and repeats the aforementioned operation. If they are identical, all relevant memory blocks have been copied and the CDU resets address counter 123a to zero and exits checkpoint mode, resetting the "buffer-nearly-full" bit and the "checkpoint mode" status bit in command/status register 128 (step 416).

While the operations in the previous paragraph are described as though the CDU itself implements the control functions needed to carry them out, it should be apparent that they can be implemented by one or more processors reading the successive addresses from the address buffer and effecting the copy through ordinary read and store operations. Implementing these functions in the CDU, however, adds only modest complexity to the MCH and can significantly reduce the amount of time needed to effect the data transfer.

In variation of this embodiment of the invention, the definition of "block-capture operation" is expanded to include, in addition to write operations, any operation that indicates the possibility of a deferred write to system memory, e.g., in the case of the MESI cache-coherency protocol, read with exclusive ownership or read with intent to modify and cache-line invalidate operations. With this change in definition and with the proviso that all data must be recognized as shared data, both the normal-mode operation shown in FIG. 3 and the checkpoint-mode operation shown in FIG. 4 proceed exactly as just described. While the copying operation previously did not depend on bus snooping, however, copying in this case is preferably done with bus snooping enabled. If this is done, the processors can omit the cache-flushing operation following the checkpoint rendezvous and instead rely on the cache coherency protocol to guarantee that the most recently modified blocks are copied. Consequently, the processors, after saving their internal states, can immediately command the CDU to enter checkpoint mode.

This same procedure can be used to establish a checkpoint in a remote backup computer as well. In this case to complete a checkpoint, the CDU sends both the addresses and their corresponding data blocks to the remote computer. Since this data needs to be buffered at the backup computer before it is moved into shadow memory, the following procedure is generally more efficient in its use of resources.

2) Post-Image Checkpointing Using Two Address and Two Data Buffers

When checkpointing is to a remote backup computer, the backup computer, as noted earlier, needs to buffer the modified data received between checkpoints before it moves it to shadow memory. While the embodiment to be described here could be implemented with a single address and a single data buffer in the backup computer, the protected computer would have to wait until the copying is completed in the backup computer before resuming normal operation. To avoid this problem, this embodiment of the invention uses two address and two data buffers, with each data buffer entry equal in size to a memory block, thereby allowing the data to be copied in background mode without disrupting normal processing in either the protected or the backup computer. To support these additional buffers, the MCH contains a total of four hardwired or, preferably, settable, base address registers (124a,b,c and d, each pointing to the initial location of one of the buffers), two buffer address counters that can be reset and incremented (123a and b), a stop-address register (130) and two additional bits in command/status register 128, the "checkpoint-copy-complete" bit and one of the "pointer" bits, here designated the "current-buffer pointer".

One data and address buffer pair is accessed using the data-buffer and address-buffer address registers formed by concatenating base registers 124a and 124b, respectively, with one of the buffer address counters 123a or 123b; the second data and address buffer pair is accessed using the data-buffer and address-buffer address registers formed by concatenating base registers 124c and 124d, respectively, also with either of the buffer address counters. Since a data block usually contains more bytes than an address, the counter contents are shifted to the left by k bits, with $2^k$ the ratio of the block length to the address length, to account for this difference before being concatenated with the data buffer base addresses. Although obviously not a necessary restriction, it will be assumed here for convenience of exposition that the k leading bits in the buffer address counter are all zeros when it used to access an address buffer location and the k least significant bits are all zeros when it is used to access a block in a data buffer. In most MCH implementations, data is fetched or stored to memory in blocks, so, preferably, $2^k$ addresses are aggregated in buffer 121 and stored to and fetched from memory in one operation as a single block In this embodiment of the invention, block-capture operations in the protected computer are again writes to system memory. On each such write, both the data block and its associated address are simultaneously relayed by the CDU to the backup computer through the I/O hub. If the MCH-to-I/O transfer rate is less than the MCH-to-memory rate, the CDU must be able to delay successive write operations to accommodate the reduced I/O rate.

One of the two pairs of data and address buffers in the backup is used to store the data blocks and memory addresses currently being received, the second pair contains data that was received during the previous checkpoint interval and is ready to be copied into the shadow memory. The address registers used to access the first of these buffer pairs will be referred to as the "current-address registers"; those used to access the second buffer pair will be referred to as the "copy-address registers" and their associated counters will be designated the "current-address counter" and the "copy-address counter", respectively. Base-address registers 124a and 124b are used to access the current buffers when the current-buffer pointer is set and registers 124c and 124d when it is not set. Buffer address counter 123a is always used as the current-address counter and buffer address counter 123b is used as the copy-address counter.

The buffers are filled by the CDU in the backup computer executing virtually the same routine depicted in FIG. 3. In this case, however, the block-capture operation in step 311 is the receipt of a data block and address from the protected computer. When this happens, the CDU, in step 312, writes the block address to the location indicated by current-address register and the data block itself to the location indicated by the current-data register. In step 315, the CDU sends a message to the protected computer informing it of the fact that the buffer is nearing capacity and in step 316, the routine suspends itself until the next I/O input. The other steps in FIG. 3 remain as previously described.

Figure 5:
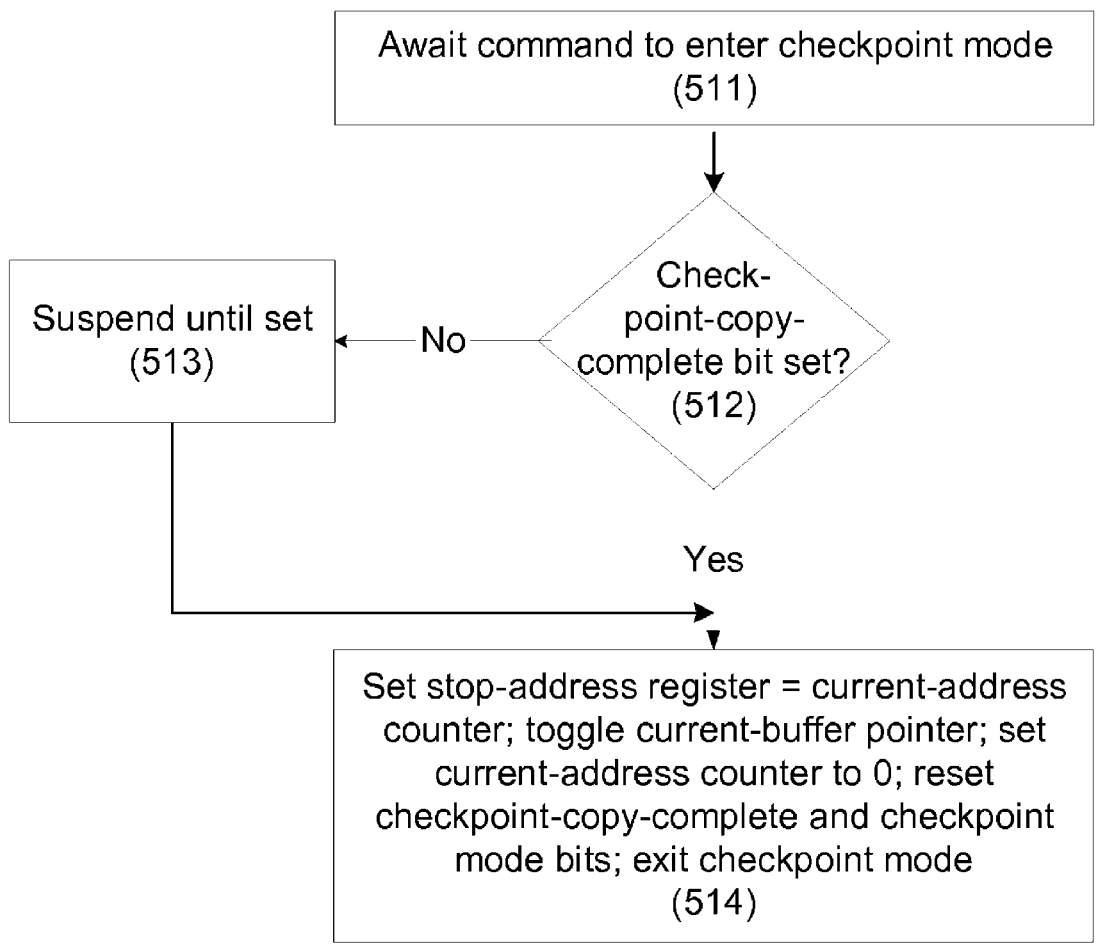
FIG. 5 is a flowchart illustrating the process executed by the control and dispatch unit to effect a checkpoint in the embodiment of the invention in which buffers are maintained for both the addresses of all blocks modified since the last checkpoint and for copies of all modified data.

Checkpointing is initiated in the protected computer as before, but is accomplished without having to wait for the modified data blocks to be copied, which is done using a separate routine. As shown in FIG. 5, when a checkpoint is initiated in the protected computer, its CDU sends a message to that effect to the backup computer (step 511). The CDU in the backup computer first checks to determine if the checkpoint-copy-complete bit has been set in its command/status register 128 (step 512) indicating that all of the memory blocks associated with the previous checkpoint have been copied to their shadow locations. The CDU suspends the checkpoint operation until this bit has been set (step 513). Once it is set, the CDU copies the contents of the current-address counter into stop-address register 130, thereby defining the number of blocks in the corresponding data buffer that have to be copied to their shadow locations, toggles the current-buffer pointer and resets buffer address counter 123a so that the alternate buffer can begin accepting new data blocks, resets the checkpoint-copy-complete bit and exits checkpoint mode (step 514). The CDU then sends a message to the protected computer informing it that the CDU has exited checkpoint mode; the CDU in the protected computer resets the checkpoint mode bit in its local command/status register enabling normal processing to resume. No I/O event in the protected computer pended on checkpoint completion, however, can be released until all memory blocks that were modified during the interval immediately preceding that checkpoint have been copied to the remote buffer. Before releasing those I/O operations, therefore, the processors wait for a checkpoint-copy-complete message from the backup computer.

Figure 6:
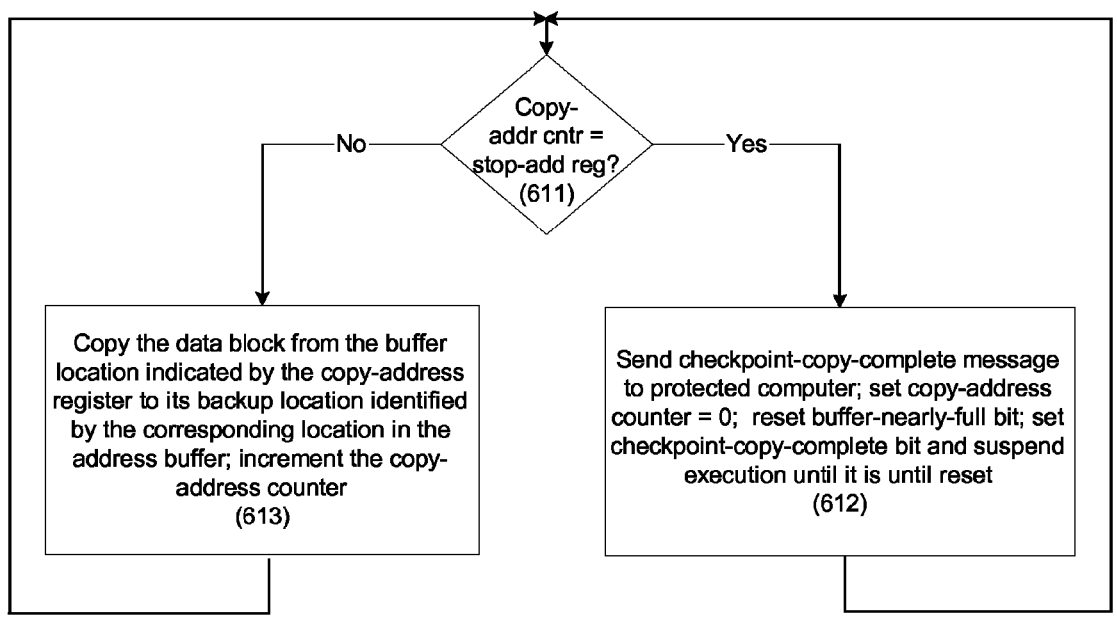
FIG. 6 is a flowchart illustrating the process executed by the control and dispatch unit to establish a new consistent system state in shadow memory in the above embodiment of the invention.

The routine for copying data blocks to their shadow locations is executed by the CDU in the backup computer. This routine, illustrated in the flowchart in FIG. 6, is launched when the checkpoint-copy-complete bit is reset and branches depending upon whether the contents of the copy-address counter and stop-address register 130 are identical (step 611). If the two match, indicating all blocks associated with the last checkpoint have been copied to their backup locations, the routine sets the checkpoint-copy-complete bit, resets the copy-address counter, resets the buffer-nearly-full status bit and sends a checkpoint-copy-complete message to the backup computer (step 612). The routine then suspends itself until the checkpoint-copy-complete bit is reset. If the checkpoint counter and the stop-address register do not match, there are more blocks to be copied so the next data block in the data block buffer is copied to the location in shadow memory indicated by the next address in the address buffer (step 613). The copy-address counter is then incremented and the routine returns to step 611.

This embodiment allows any computer to checkpoint its state to a shadow memory in a remote backup computer and simultaneously serve as the backup computer for that or for some other computer. When its local processors rendezvous to initiate a checkpoint and set the checkpoint mode bit in command/status register 128, the CDU sends a message through the I/O hub to the backup computer and awaits a response indicating that the checkpoint has been completed enabling it to reset the checkpoint mode bit and allowing the processors to resume normal operation. When it receives a message from the computer it is backing up to initiate a checkpoint, it executes the routine depicted in FIG. 5 and responds to that computer on exiting that routine. It continuously executes the copy routine shown in FIG. 6 and sends buffer-nearly-full and checkpoint-copy-complete messages back to the protected computer whenever those states are encountered. This causes the CDU in the protected computer to set corresponding bits in its local command/status register.

In a slight variation on this embodiment, the two data buffers can be combined into one circular data buffer and the two address buffers can be combined into one circular address buffer. In this case, the current and copy addresses are both defined using the same pair of base registers; the current-address register is then determined by concatenating these base registers with buffer address counter 123a and the copy-address register by concatenating them with buffer address counter 123b. In this implementation, the buffer address counters are not reset when a checkpoint is established or when a copy operation is completed. Rather they continue to be incremented, returning to the all-zeros state after being incremented when in the all-ones state. To determine when the buffer reaches capacity, the CDU increments counter 132 on each write to system memory; the contents of this counter are then compared with the contents of buffer capacity register 126 to determine when to set the buffer-nearly-full status bit. Counter 132 is reset at each checkpoint. Since it is conceivable that the current address counter could be incremented past the copy address counter, thereby causing a new address and data block to overwrite information stored during the previous checkpoint interval before it has been copied, the CDU must execute a copy operation before allowing any writes to the buffers whenever match detector 125 indicates that the contents of the two address counters are identical. Moreover, since the current and copy address registers both point to the same buffers and are not reset when a checkpoint or copy is completed, their functions do not change following such events and the current-buffer pointer is ignored in this implementation. With these exceptions, the separate and unified buffer implementations are identical.

This embodiment of the invention, with two address and two data buffers, can obviously be used for local checkpointing as well. This would add an additional write to memory for each modified data block (the write to the data buffer), but would allow the memory-to-memory copy following a checkpoint to be done in the background while normal processing continues following a checkpoint.

3) Post-Image Checkpointing Using a Bit-Map Memory

The copying time resulting from the aforementioned embodiments of the invention using memory-resident buffers could be reduced somewhat by, for example, integrating the address buffers into the MCH itself, thereby saving one external memory access on each transfer. A generally more efficient use of internal MCH memory is possible, however, by integrating into it auxiliary memory 133, here containing a single bit for each memory block in physical memory, along with its associated data and address registers 134 and 135, respectively. In the previously described post-image checkpointing embodiments of the invention, memory blocks are copied to their backup locations in first-in, first-out (FIFO) fashion. That is, the first blocks to be modified are the first copied to shadow memory. This ensures that, in the event of multiple modifications to a given block, the last modification is the one that survives, overwriting any earlier modifications of that same block in the copying process. But the need to copy any given block more than once can be eliminated entirely by copying, instead, in last-in, first-out (LIFO) order and by setting a bit in the auxiliary memory corresponding to each physical memory block copied. Prior to any copy, the CDU then checks this bit-map to determine if the block has already been copied and, if it has, aborts the copy and reads the address (in this case, the previous address stored in the address buffer) of the next data block to be copied. Once all blocks have been copied, the auxiliary memory is cleared. The copying time in all of the previously described embodiments can be reduced somewhat using this procedure.

To implement this embodiment of the invention, the checkpoint and copying routines shown in FIGS. 5 and 6 need to be modified as follows: In step 514, the stop-address register is (permanently) set to zero and the copy-address counter is loaded with the contents of the current-address counter which is then also set to zero. Setting the copy-address counter need to zero in step 612 can be omitted, In step 613, the CDU first checks the bit map to determine if a later version of the block in question has already been copied (i.e., if the bit corresponding to the current copy address has been set) and, if it has, skips the copy and decrements the copy-address counter; if the bit has not been set, it first executes the copy as shown in step 613 and then decrements the counter. Note that this procedure can be used with both local and remote checkpointing. In the latter case, the remote CDU manages the bit-map, setting the corresponding bit in the bit-map when it receives a data block from the protected computer.

Since the system memory will, in general, contain a large number of blocks and since the vast majority of those blocks will not have been modified since the last checkpoint, it is preferable, with this embodiment of the invention, for a number, say 32 or 64, of copy-map bits to be loaded simultaneously into data register 134. If all bits are zero, as will typically be the case, the copy routine can immediately proceed to the next set without having to test each bit individually.

4) Local Post-Image Checkpointing Using Two Bit-Map Memories

Further efficiencies are possible by using two bit-map memories, each having one bit representing each block in system memory, if one is used as, as before, to show which memory blocks have been modified since the last checkpoint and the second used to show which of the blocks that were modified prior to the last checkpoint have been copied to the local shadow memory. In this case, background copying can be supported without address or data buffers. One of the two bit-maps is designated the "modified map" and the other the "copy map". Either of the two physical single-bit memories assumes either role at different times. The CDU uses one of the pointer bits in command/status register 128, here called the "current-map pointer", to indicate which bit-memory is the current map. By default, the other bit-memory is the copy map.

On any memory access the CDU first checks to see if it is a block-capture operation, with the term "block-capture" as previously defined (i.e., either only a write operation or any of the operations that will potentially result in the modification of the block in question, including, of course write operations). If it is not, the access is handled in the normal way. If it is, the CDU sets the bit in the current map corresponding to the addressed block and checks whether the checkpoint-copy-complete command/status bit has been set. If it has, the access is again handled in the normal way; if it is not set, the CDU checks the corresponding bit in the copy map. If that bit is set, indicating that the block in question may have been modified during the previous checkpoint interval, but has not yet been copied to the shadow memory, the CDU first copies the current contents of the block to the corresponding location in the shadow memory and resets the copy bit before allowing the access to proceed.

The checkpoint and copy routines remain essentially as previously described. The only difference in the checkpoint routine is that the current-buffer pointer is now the current-map pointer in step 514. In copy routine, the CDU resets the copy bit following the block copy executed in step 613 and, in step 612, it also toggles the current-map pointer.

While this procedure could also be used for remote checkpointing, the copied data blocks and associated addresses would still have to be buffered in the backup computer before they could be copied into shadow memory, thereby defeating the major advantage of having the two bit maps, namely the elimination of the need for data and address buffers.

Since the system memory will, in general, contain a large number of blocks and since the vast majority of those blocks will not have been modified since the last checkpoint, it is preferable, with this embodiment of the invention, for a number, say 32 or 64, of copy-map bits to be scanned simultaneously. If all bits are zero, as will typically be the case, the copy routine can immediately proceed to the next set without having to test each bit individually.

5) Local Post-Image Checkpointing Using a Block-State Memory

Figure 7:
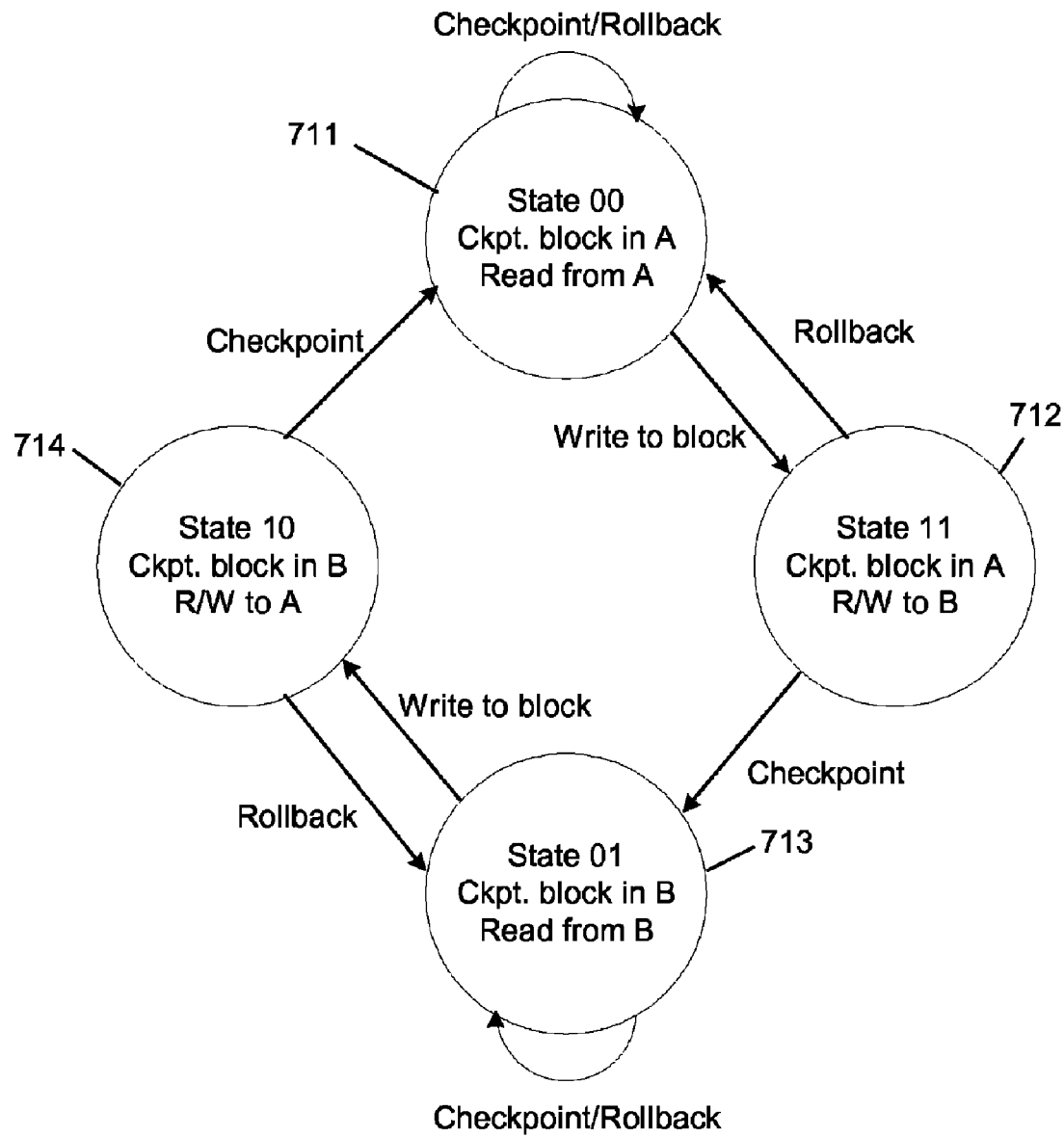
FIG. 7 is a state diagram showing the states used to label each block in system memory and actions causing transitions between those states when, in accordance with another aspect of the invention, local post-image checkpointing is implemented without requiring any memory-resident address or data buffers or any memory-to-memory copying.

Even greater efficiencies can be realized with a bit-map memory containing two bits for each memory block in physical memory when checkpointing to a local shadow memory. In this case, the need for memory-to-memory copies for checkpointing purposes can be eliminated entirely if, on each memory access, the CDU checks the state in the block-state memory location corresponding to the block being accessed and directs the access to either of two system memory locations in accordance with that state. In this embodiment, the computer's primary and shadow memories are no longer fixed physical locations; rather, either of two physical locations corresponding to a given block can be the primary location at any given time while the other retains the state of the system that existed at the time of the last checkpoint. The algorithm used by the CDU to determine which is which is shown in FIG. 7. Each system memory block directed to one of the two predefined locations in system memory, designated in FIG. 7 as "block A" or "block B", as determined by that algorithm. The most straightforward procedure for directing the access is for the CDU to toggle the most-significant bit of the memory address. For convenience of exposition, it will be assumed here that the most-significant address bit is set by the CDU to "0" for block A and to "1" for block B. If a block is in state 00 (711), in particular, the CDU addresses all reads from that block to block A and block A is also the checkpointed version of that block should a rollback be necessary before the next checkpoint is established. The block remains in state 00 until a write access is attempted, in which case it transitions to state 11 (712). The write precipitating the transition is directed to block B as are all subsequent accesses, both read and write, either until the next checkpoint is established or a rollback is initiated. Block A contains the checkpointed data block (i.e., is part of the shadow memory) and block B the data block as modified since the last checkpoint. When a new checkpoint is established, the state associated with that block transitions to 01 (713) and block B is now part of the shadow memory. If a rollback is initiated before the checkpoint, the state is reset to state 00. Similarly, if a data block is in state 01, all read accesses are directed to block B and it remains in that state until the first write access causes it to transition to state 10 (714); the write causing the transition and all further accesses, prior to the next checkpoint or rollback, are then directed to block A. Upon the establishment of the next checkpoint, the block transitions to state 00 or, in the event of a rollback, it is returned to state 01.

Figure 8:
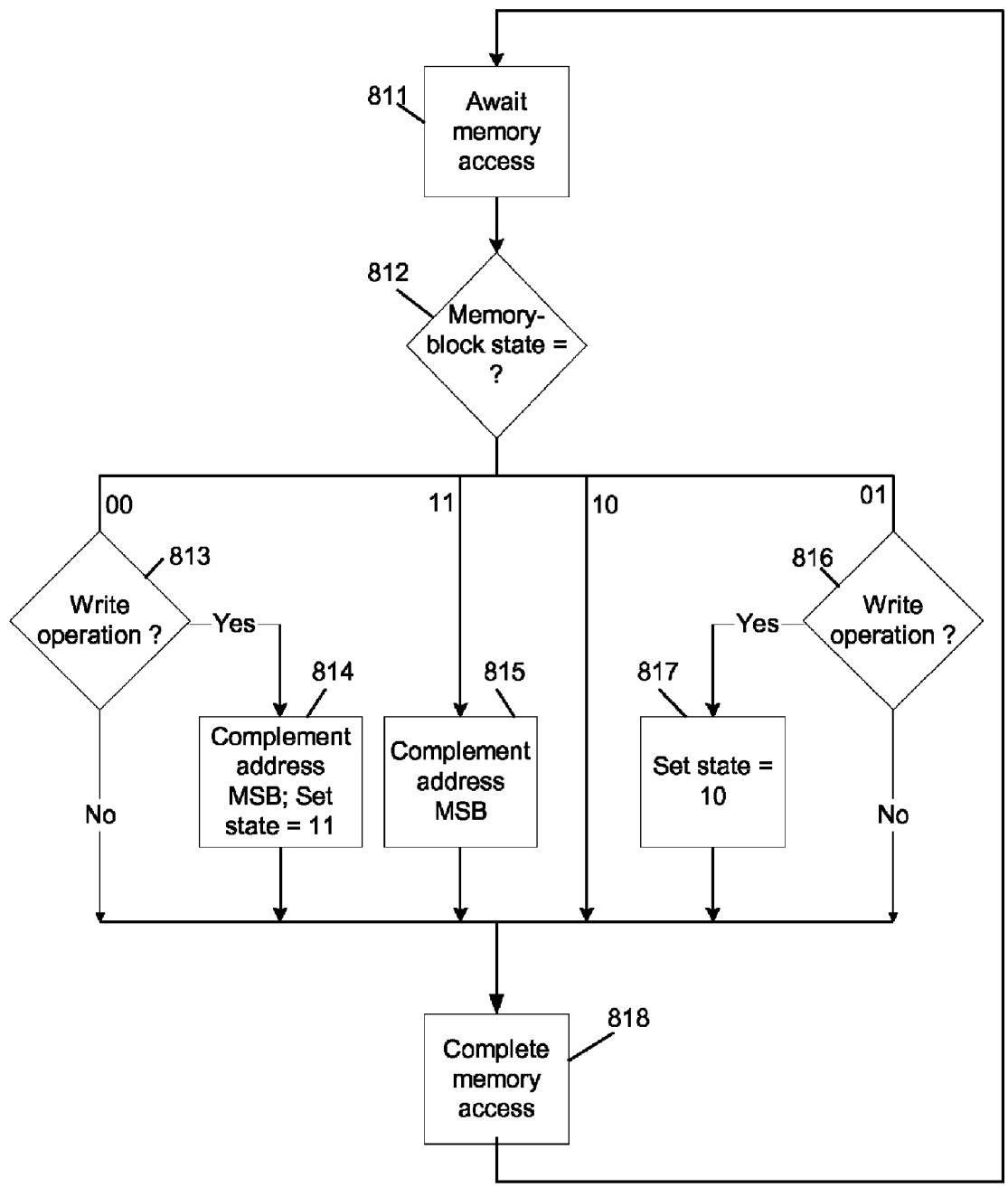
FIG. 8 is a flowchart showing the procedure executed by the control and dispatch unit to implement the state transitions described by the FIG. 6 state diagram.

To realize this embodiment, the CDU implements the flowchart shown in FIG. 8. On each system memory access (step 811), the CDU checks the state associated with the memory block being accessed (step 812). If it is in state 00 or 01, it then determines if the memory access is a write operation (step 813 and step 816, respectively). If the block is in state 00 when the write access is initiated, it changes the state to 11 and complements the most significant bit of the address of the block being accessed (step 814); if it is in state 01, it changes the state to 10 and leaves the address unmodified (step 817). If the accessed block is in either state 11 or 10, it leaves the state unchanged. In the former case, it then complements the most significant address bit (step 815); in the latter case, it leaves the address unmodified. In all cases, it then lets the access proceed in the normal manner using the address thus generated (step 818).

When a checkpoint is declared, the CDU executes the routine shown in the flowchart in FIG. 9a. In particular, it sets the more significant of the two state bits of each block to "0" (step 911), preferably by using a master reset on the relevant column of the state memory. It then resets the checkpoint mode bit in command/status register 128 (step 912), generates a processor-visible interrupt, and exits checkpoint mode.

In all embodiments of the invention, rollback following a fault is accomplished by switching to the shadow memory or to the backup computer and as described in U.S. Pat. No. 6,622,263. With this embodiment, when it is necessary to institute a rollback, the CDU switches to the local shadow memory by implementing the routine shown in FIG. 9b. On receiving a command to enter rollback mode and setting the "rollback-mode" status bit, the CDU changes the less significant bit (LSB) of each memory state to the exclusive- or of the two state bits and sets the more significant bit (MSB) to 0 (step 913). Once this has been accomplished, the CDU resets the rollback-mode status bit and exits rollback mode (step 914). The result of this operation is to modify the state of each memory block as follows: blocks in state 11 are changed to state 00; those in state 10 are changed to 01; the states of blocks in either of the other two states are left unchanged.

6) Local Pre-Image Checkpointing

The memory controller hub with a subset of the added logic shown in FIG. 2 can also be used to implement local pre-image checkpointing. In this case, buffer 120 is used to store the pre-images of blocks that are modified following the establishment of each checkpoint and buffer 119 used to store the physical addresses of those blocks. Base registers 124a and 124b are used, in combination with buffer address counter 123a to define, respectively, the address- and data-buffer registers, which, in turn, point to the next available location in the address and data buffers.

Figure 10:
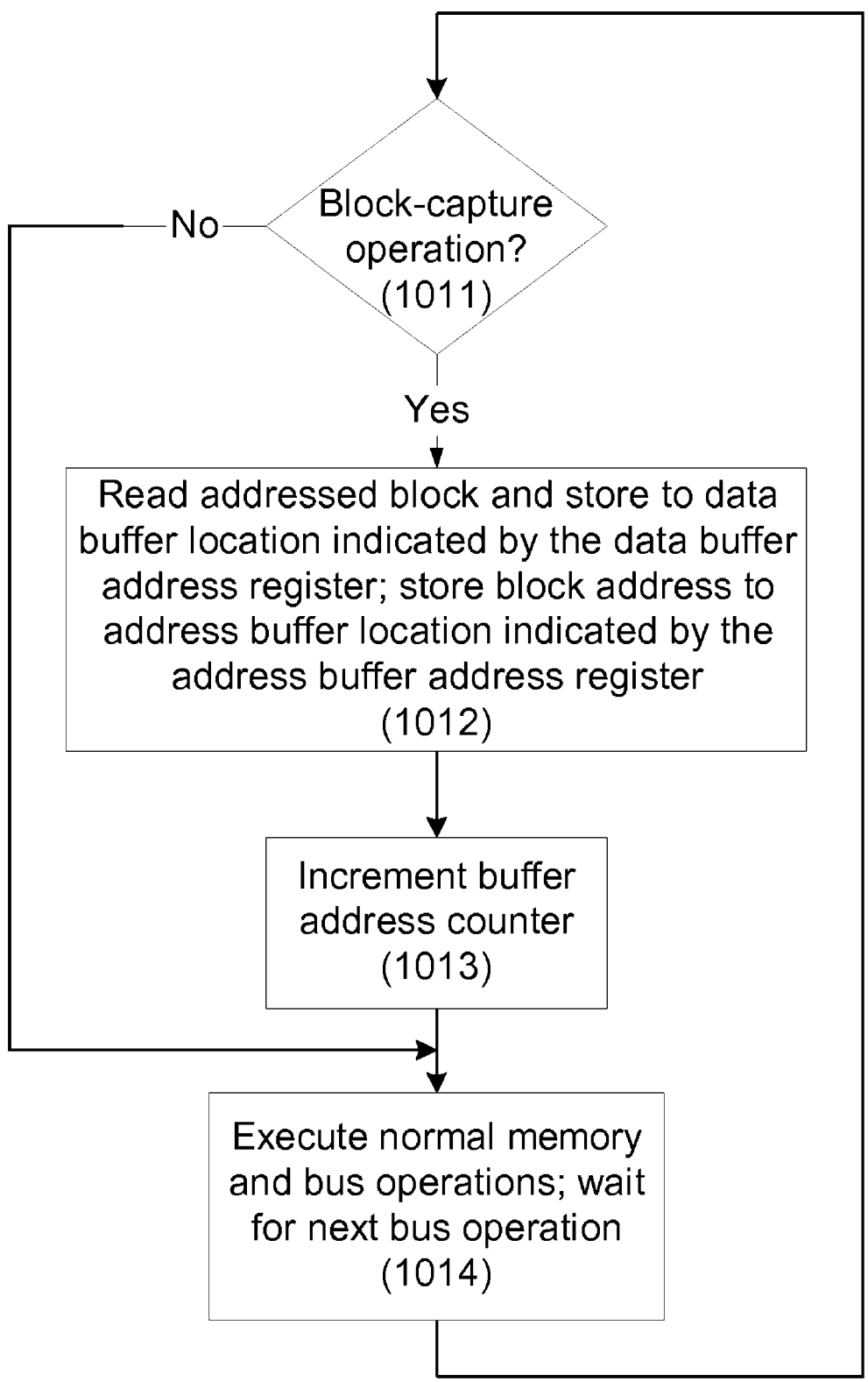
FIG. 10 is a flowchart showing the procedure executed by the control and dispatch unit to support pre-image checkpointing.

The routine implemented by the CDU to support pre-image checkpointing is shown in FIG. 10. On each block-capture operation (step 1011) the CDU first reads the memory block so indicated and stores the data thus read in the data buffer and the associated address in the address buffer (step 1012). As before, a block-capture operation can be either a memory-write operation or, in addition to write operations, any operation that indicates the possibility of a deferred write to system memory. In the former case, establishing a checkpoint first involves flushing the contents of all processor caches back to system memory before commanding the CDU to enter checkpoint mode. In the latter case, no cache flushing is required.

Once the data block and associated address are copied to the buffers, buffer address counter 123a is incremented to point to the next available locations (step 1013) and the CDU then continues with the memory access in the normal way (step 1014) executing the standard memory access procedures and bus protocols.

Figure 11A:
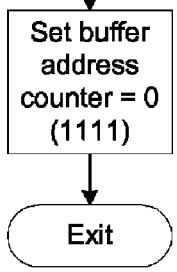
FIGS. 11a and 11b are flowcharts showing the procedures executed by the control and dispatch unit to effect a checkpoint and to implement a rollback when pre-image checkpointing is being implemented.

To effect a checkpoint, the processors rendezvous in the usual way, save their states and, if required, flush their caches, then command the CDU to enter checkpoint mode Since, at this point, system memory reflects the correct checkpointed state, the CDU's response consists solely of resetting buffer address counter 123a and immediately exiting checkpoint mode (step 1111 in FIG. 11a).

Figure 11B:
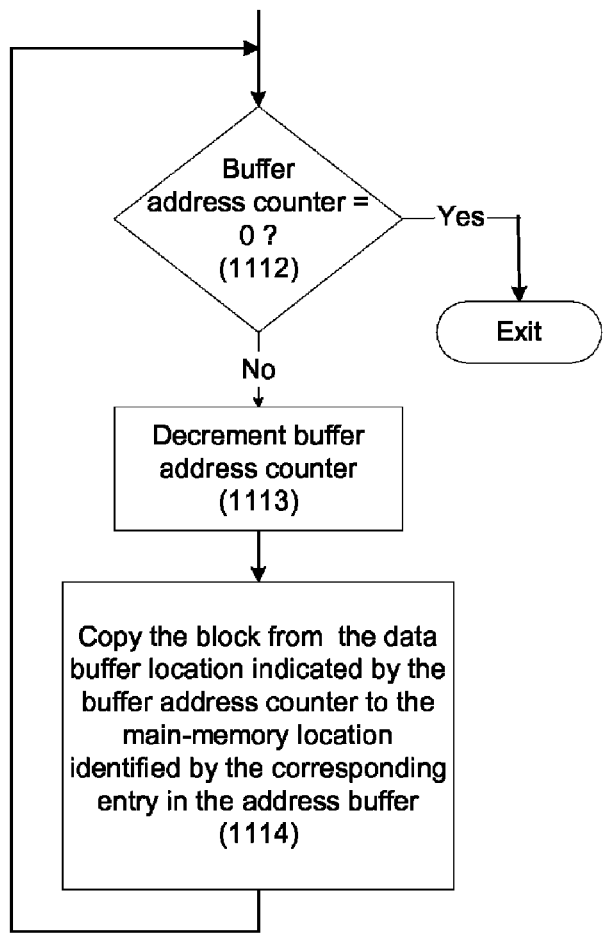

Whereas rollback in the case of post-image checkpointing involves resuming operation using the shadow memory as the system memory, here it is effected by restoring system memory to the state that existed at the time of the last checkpoint. To accomplish this, the CDU first checks the state of buffer address counter 123a (step 1112 in FIG. 11b). If it is in the all-zeros state, no blocks have been copied to the data buffer since the last checkpoint and there is nothing more for it to do, so it immediately exits. If the counter contents are greater than zero, the CDU decrements it (step 1113) and copies the contents of the data stored at the buffer location pointed to by the data-buffer register to the memory location indicated by the address-buffer register (step 1115). It then again decrements the counter (step 1113) and copies the next block to its indicated location in system memory. It continues this procedure, copying from the buffer in LIFO order, thereby restoring system memory to the state that prevailed at the time of the last completed checkpoint.

As with post-image buffering, the possibility of copying to the same system-memory location more than once can be eliminated by implementing a small memory having one bit for every physical block in system memory. In this case, the corresponding bit is inspected before any block is copied to the buffer (cf. FIG. 10, step 1012). If it is set, no copy is necessary; otherwise, the copy takes place and the bit is then set. This eliminates unnecessary copying both during normal operation and on a rollback.

What is claimed is:

1. Apparatus enabling an otherwise standard computer to support system-directed checkpointing by periodically capturing and storing a consistent image of the system state from which all running applications can be safely resumed following a fault, such apparatus comprising a conventional memory controller hub having the following additional functional elements:
   a. a control and dispatch unit (CDU), implemented by a microcontroller or microprocessor, preferably the microcontroller or microcomputer normally embedded in a standard memory controller hub, capable of executing stored programs that enable the memory controller hub to:
      intervene in normal memory accesses to capture and store in an address buffer the addresses of the data blocks that are about to be modified as a result of that access;
      intervene in a normal memory access to capture and store in a data buffer the contents of the data block that is about to be modified as a result of that access, either before or after such modification;
      intervene in a normal memory access to capture and relay to a backup computer through the computer's input/output (I/O) hub the contents of a data block that was modified as a result of that access along with the address of the modified data block and to delay any subsequent access that can modify the contents of a data block until receipt of the data and address has been acknowledged by the backup computer;
      use the captured addresses to copy the corresponding data blocks, either from the location in system memory defined by those addresses or from the data buffer, to another location in system memory or to a local shadow memory or, through the computer's input/output (I/O) hub using any standard transfer protocol, to a shadow memory in another computer;
      store into data and address buffers data blocks and associated addresses received through the computer's I/O hub;
      send and receive messages from another computer to coordinate the above activities with those of that computer;
   b. one or more registers that can be set, incremented and decremented and whose contents can be compared with those of other registers to support the above operations;
   c. a register containing status bits some of which can be hard-wired while others can be set and reset by the CDU or by any central processor to coordinate the above operations.

2. The apparatus of claim 1 in which the term "about to be modified" refers to either an impending write to the addressed memory block or an access that is determined by the computer's cache-coherency protocol to be one that may result in either an immediate or a subsequent write to the addressed memory block and the terms "captured addresses" and "captured data blocks" refer to the addresses of the data blocks and the data blocks, respectively, to which the term "about to be modified" applies.

3. The apparatus of claim 1 in which the address buffers and data buffers are located either in specific segments of system memory or in separate random-access memories dedicated to that purpose.

4. The apparatus of claim 1 in which the checkpointed system state is maintained in a shadow memory consisting of either
   a. a partition of the computer's random-access memory equal in size and organization to the computer's system memory and located either in the computer itself or in a separate backup computer, or
   b. all data blocks in system memory that have not been modified since the last checkpoint in combination with the contents of the address and data buffers.

5. The apparatus of claim 1 in which the: control and dispatch unit (CDU) can operate in any of the following, not necessarily mutually exclusive, modes:
   a. fault mode in which the CDU prevents accesses initiated by the input/output hub from modifying system memory;
   b. checkpoint mode in which the CDU ensures that the image of a consistent system state has been updated;
   c. copy mode, in which the CDU copies data blocks associated with addresses stored in an address buffer either directly from the locations in system memory of said data blocks or from a data buffer to the locations in shadow memory corresponding to said addresses;
   d. rollback mode, in which, depending on the specific embodiment of the invention, the CDU either redirects all system memory accesses to the local shadow memory or else copies data blocks held in a buffer back to those locations in system memory indicated by the corresponding entries in an address buffer.

6. The apparatus of claim 1 further comprising an interface to an auxiliary memory, that may or may not be integrated into the memory controller hub itself, with up to two bits corresponding to each physical data block in system memory, the interface implementing the ability to read or write to any location in the auxiliary memory, to cycle through all of the auxiliary memory's addresses in sequence, and to recognize when an all-zeros entry has been read.

7. The apparatus of claim 1, comprising some or all of the following registers and associated logic:
   a. a first data-buffer address register, used for accessing one of the data buffers, in which a specified number of the register's most-significant bits are either settable or hard-wired and the remaining bits are implemented in a counter that can be cleared and either incremented or decremented or both and that resets to zero when incremented past the counter's maximum count;
   b. a second data-buffer address register, used for accessing a second data buffer in which a specified number of the register's most-significant bits are also either settable or hard-wired and the remaining bits are implemented in a counter that can be cleared and either incremented or decremented or both and that resets to zero when incremented past the counter's maximum count;
   c. a first address-buffer address register, used for accessing one of the address buffers, in which a specified number of the register's most-significant bits are either settable or hard-wired and the remaining bits are implemented using the same counter used to implement the first data-buffer address register;
   d. a second address-buffer address register, used for accessing a second address buffer, in which a specified number of the register's most-significant bits are either settable or hard-wired and the remaining bits are implemented using the same counter used to implement the second data-buffer address register;
e. a stop-address register that can be loaded from either of the previously described registers and used to indicate when the entire contents of one buffer have been moved to a shadow memory;
f. a counter that can be incremented, decremented and reset;
g. a settable or hardwired buffer-capacity register defining the number of buffer entries that determine when a buffer is nearing capacity;
h. a status register with some bits that may be hard-wired and other bits that can be individually set and reset by the control and dispatch unit (CDU) or by any of the processors, all of which bits can be used by the CDU to define the CDU's mode of operation;
i. logic capable of detecting when the contents of certain pairs of registers are identical;
j. logic that generates processor-visible interrupts whenever certain status bits are set or reset by the CDU and that generates CDU-visible interrupts whenever certain status bits are set by a processor.

8. The apparatus of claim 1 in which the control and dispatch unit establishes checkpoints by capturing the addresses of all blocks about to be modified and storing those addresses to an address buffer, and then, when in checkpoint mode, reading each address from the address buffer in first-in-first-out order and moving a copy of the contents of the location having that address in system memory either to the location in a local shadow memory having that same address or, along with the address itself, to a remotely located backup computer through the input/output hub.

9. The apparatus of claim 1 in which the control and dispatch unit supports checkpointing by transferring to a designated backup computer, through the input/output hub using any standard transfer protocol, simultaneously with each write to system memory, both the block being written and the system-memory address of that block and delaying subsequent system-memory accesses if necessary until the transfer has been acknowledged.

10. The apparatus of claim 1 in which the control and dispatch unit establishes checkpoints by storing captured data blocks and their associated addresses to one of two data/address buffer pairs, as determined by a status bit, and concurrently moving data in first-in-first-out (FIFO) order from the other data buffer to those locations in a local shadow memory defined by the addresses retrieved in FIFO order from the other address buffer and delaying subsequent memory accesses to a data block until both the data and the address associated with any previous memory write to that data block have been stored in their respective buffers.

11. The apparatus of claim 10 in which data is moved in first-in-first-out-order to local shadow memory from the same buffers into which new addresses and data are being written once the other buffer pair has been emptied.

12. The apparatus of claim 10 in which the control and dispatch unit manages the two address buffers as a single circular buffer and the two data buffers as a second single circular buffer.

13. The apparatus of claim 1, in which the control and dispatch unit establishes checkpoints for another computer by storing the data-blocks and associated system-memory addresses received from that computer to either of two data/address buffer pairs, as determined by a status bit, and concurrently moving data in first-in-first-out (FIFO) order from the other data buffer to those locations in a local shadow memory defined by the addresses retrieved in FIFO order from the other address buffer, toggling the status bit identifying which of the two buffer pairs is being used to store new data when a checkpoint-mode message is received from the other computer and the transfer of all data from the alternate pair has been completed and sending a message to the protected computer to that effect.

14. The apparatus of claim 1 embedded in a first computer with a control and dispatch unit capable of executing the operations needed to collect and transfer captured data blocks and associated addresses to a second computer and simultaneously executing the operations needed for the first computer to serve as a backup for another computer that can be, but need not be, different from the second computer.

15. The apparatus of claim 6 in which the auxiliary memory serves as a bit-map memory containing one bit for every physical block in system memory and in which the control and dispatch unit uses those bits to avoid having to copy a memory block associated with any specific system-memory address more than once to effect any single checkpoint.

16. The apparatus of claim 6 in which the auxiliary memory is a block-state memory containing two bits representing the "state" of each data block in system memory and in which the control and dispatch unit manipulates this state information to establish checkpoints in a local shadow memory without requiring any memory-to-memory transfers.

17. The apparatus of claim 1 in which the control and dispatch unit (CDU) establishes checkpoints and, when required, effects rollbacks by maintaining a pair of last-in-first-out (LIFO) buffers, one used to store the address of each data block that has been modified since the last checkpoint and the other a copy of the data block that was stored at that location prior to the modification of said data block, delaying any attempt to write to a data block until the CDU has stored the address of said data block to the address buffer and the CDU has copied the current contents of said data block to the data buffer, resetting the buffer addresses when in checkpoint mode and moving the contents of the data buffer in LIFO order back to the system-memory addresses retrieved in LIFO order form the address buffer when in rollback mode.

18. The procedures, including the data and address capturing, checkpointing, copying and rollback procedures, used by the apparatus of claim 1 to execute the following checkpointing strategies:
a. local post-image checkpointing using an address buffer;
b. post-image checkpointing using two address buffers and two data buffers:
c. post-image checkpointing using two address and two data buffers and a bit-map memory storing one bit for each data block in system memory;
d. local post-image checkpointing using two bit-map memories each storing one bit for each block in system memory and no address or data buffers;
e. local post-image checkpointing using a block-state memory having two bits for each data block in system memory, no address or data buffers, and requiring no memory-to-memory copying;
f. pre-image checkpointing using an address buffer and a data buffer.

* * * * *